(12) United States Patent
Matoba et al.

(10) Patent No.: US 11,333,066 B2
(45) Date of Patent: May 17, 2022

(54) ENGINE CONTROL DEVICE

(71) Applicant: Mazda Motor Corporation, Hiroshima (JP)

(72) Inventors: Yasunori Matoba, Aki-gun (JP); Takafumi Nishio, Aki-gun (JP); Satoshi Watanabe, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/464,972

(22) Filed: Sep. 2, 2021

(65) Prior Publication Data
US 2022/0120212 A1 Apr. 21, 2022

(30) Foreign Application Priority Data
Oct. 16, 2020 (JP) .............................. JP2020-174452

(51) Int. Cl.
*F02B 37/18* (2006.01)
*F02D 41/00* (2006.01)

(52) U.S. Cl.
CPC ........ *F02B 37/183* (2013.01); *F02D 41/0007* (2013.01); *F02D 2200/023* (2013.01); *F02D 2200/0414* (2013.01); *F02D 2200/101* (2013.01)

(58) Field of Classification Search
CPC ................. F02B 37/18–186; F02D 2200/0414
See application file for complete search history.

(56) References Cited

U.S. PATENT DOCUMENTS

2014/0326226 A1 11/2014 Senda et al.
2015/0240732 A1* 8/2015 Makihara ............... F01M 13/02
                                                          123/563
2018/0283266 A1* 10/2018 Niwa ..................... F02B 37/013

FOREIGN PATENT DOCUMENTS

JP           2013151906 A        8/2013

* cited by examiner

*Primary Examiner* — Ngoc T Nguyen
(74) *Attorney, Agent, or Firm* — Alleman Hall Creasman & Tuttle LLP

(57) ABSTRACT

An engine control device is provided, which includes a blowby gas passage connecting an engine body to an intake passage so that blowby gas leaked from a combustion chamber is recirculated to the intake passage, a boost pressure changer configured to change a boost pressure of a turbocharger, and a controller configured to set a target boost pressure and control the boost pressure changer. The turbocharger includes a turbine which is provided to an exhaust passage and driven by exhaust gas, and a compressor which is provided to the intake passage and rotary driven by the turbine to boost intake air. The blowby gas passage is connected to the intake passage near the compressor. The controller corrects the target boost pressure when an ambient temperature is below a given determination temperature, to be higher than the target boost pressure when the ambient temperature is at or above the determination temperature.

19 Claims, 10 Drawing Sheets

ENGINE CONTROL DEVICE

TECHNICAL FIELD

The present disclosure relates to a control device for an engine provided with an engine body having a combustion chamber, an intake passage through which intake air to be introduced into the engine body passes, an exhaust passage through which exhaust gas discharged from the engine body passes, and a turbocharger which boosts the intake air.

BACKGROUND OF THE DISCLOSURE

JP2013-151906A discloses an engine provided to a vehicle, in which an intake passage and an engine body are communicated with each other through a blowby gas passage (PCV passage) so that blowby gas is recirculated to the intake passage. The blowby gas is gas leaked from a combustion chamber defined in the engine body to a space inside the engine body other than the combustion chamber.

The blowby gas is mainly composed of combustion gas and contains water. Therefore, when the ambient temperature is low, the water contained in the blowby gas is condensed and the condensate water is introduced into the intake passage. Here, when the ambient temperature is especially low, the condensate water may be cooled and frozen by the intake air at the low temperature. Accordingly, an ice block may be formed at a connecting part between the intake passage and the blowby gas passage. Then, when the ice block flows toward the engine body, the engine components may be damaged.

With regard to this problem, in the engine disclosed in JP2013-151906A, an outer wall of an exhaust gas recirculation (EGR) passage through which exhaust gas discharged from the engine body recirculates to the intake passage, and an outer wall of the blowby gas passage are positioned to be adjacent to each other so that the temperature of the blowby gas is increased by the exhaust gas at the high temperature flowing inside the EGR passage. Thus, the condensation of the water contained in the blowby gas can be suppressed.

The configuration disclosed in JP2013-151906A may not sufficiently prevent the ice block from being formed at the connecting part between the blowby gas passage and the intake passage. In detail, exhaust gas is recirculated to the intake air through the EGR passage in order to lower the combustion temperature and to reduce emissions of NOR. Therefore, when the ambient temperature is low and the combustion is likely to be unstable, the exhaust gas is not recirculated to the intake air through the EGR passage. Thus, when the ambient temperature is low and the condensate water in the blowby gas easily freezes, the configuration disclosed in JP2013-151906A cannot heat the blowby gas by the exhaust gas inside the EGR passage. As a result, the freezing of the condensate water and the accompanying formation of the ice block are not sufficiently prevented.

SUMMARY OF THE DISCLOSURE

The present disclosure is made in view of the above situation, and one purpose thereof is to provide an engine control device, which is capable of effectively preventing freezing of condensate water contained in blowby gas, and accompanying formation of an ice block.

According to one aspect of the present disclosure, a control device for an engine is provided, the engine provided with an engine body having a combustion chamber, an intake passage through which intake air to be introduced into the engine body passes, an exhaust passage through which exhaust gas discharged from the engine body passes, and a turbocharger configured to boost the intake air. The control device includes a blowby gas passage connecting the engine body to the intake passage so that blowby gas leaked from the combustion chamber is recirculated to the intake passage, a boost pressure changer configured to change a boost pressure of the turbocharger, and a controller configured to set a target boost pressure and control the boost pressure changer so that the boost pressure becomes the target boost pressure, the target boost pressure being a target value of the boost pressure. The turbocharger includes a turbine provided to the exhaust passage and configured to be driven by the exhaust gas, and a compressor provided to the intake passage and configured to be rotary driven by the turbine to boost the intake air. The blowby gas passage is connected to the intake passage near the compressor. The controller corrects the target boost pressure when an ambient temperature is below a given determination temperature, to be higher than the target boost pressure when the ambient temperature is at or above the determination temperature.

According to this configuration, in the engine provided with the turbocharger, the blowby gas passage is connected to the part of the intake passage near the compressor. Therefore, thermal energy transferred to a compressor accommodating part from a turbine accommodating part heated with exhaust gas at a high temperature passing through the turbine, can be supplied to a connecting part between the intake passage and the blowby gas passage, and the connecting part can be increased in temperature. In particular, during the operation of the engine, since the exhaust gas at the high temperature constantly passes through the turbine, even when the ambient temperature is low, the connecting part can be sufficiently increased in temperature with the thermal energy of the exhaust gas. As a result, freezing of the condensate water contained in the blowby gas, and accompanying formation of an ice block at the connecting part, can be effectively prevented.

In addition, according to this configuration, when the ambient temperature is especially low (below the given determination temperature), the target boost pressure is increased to be higher than that when the ambient temperature is at or above the determination temperature, and the boost pressure changer is controlled to achieve the increased target boost pressure. That is, when the ambient temperature is below the determination temperature, the boosting force of the turbocharger is increased and the intake air (air) is further compressed by the compressor, compared to when the ambient temperature is at or above the determination temperature. Therefore, even when the freezing of the condensate water and the formation of the ice block are likely to occur due to the especially low ambient temperature, the temperature of the intake air passing the compressor is increased, and the temperature of the part of the intake passage around the compressor (i.e., the connecting part) can be increased. As a result, the possibility that the condensate water is frozen and the ice block is formed at the connecting part can sufficiently be reduced.

The control device may further include a throttle valve provided to the intake passage and configured to open and close the intake passage. When the controller executes the correction of the target boost pressure, the controller may control the throttle valve so that an opening of the throttle valve becomes smaller than the opening when the ambient temperature is at or above the determination temperature.

According to this configuration, when the boost pressure of the turbocharger is increased with the ambient temperature being below the determination temperature, the amount of the intake air to be introduced into the engine body can be prevented from becoming larger than required.

The boost pressure changer may include a bypass passage provided to the exhaust passage and bypassing the turbine, and a wastegate valve configured to open and close the bypass passage to adjust an amount of exhaust gas passing through the bypass passage and the turbine. The controller may control an opening of the wastegate valve so that the boost pressure becomes the target boost pressure.

According to this configuration, the freezing of the condensate water and the formation of the ice block at the connecting part can be prevented utilizing the wastegate valve.

The controller may execute the correction of the target boost pressure when an engine load is at or above a given load.

When the engine load is below the given low, the pressure inside the engine body is low. Thus, the flow of the blowby gas from the engine body to the intake passage through the blowby gas passage decreases, and the amount of condensate water caused by the blowby gas also decreases. Moreover, the control of the wastegate valve so as to increase the boost pressure of the turbocharger is to reduce the opening of the wastegate valve and increase the amount of exhaust gas introduced into the turbine. Thus, when the boost pressure of the turbocharger is increased, a back pressure of the engine body increases and fuel efficiency may degrade. According to this configuration, as described above, the target boost pressure is corrected to be increased when the engine load is at or above the given load. That is, the boost pressure is increased when the amount of condensate water introduced into the intake passage is large and the ice block is easily formed, whereas the correction to increase the boost pressure is not performed when the ice block is unlikely to form. Therefore, the formation of the ice block at the connecting part can be effectively prevented, while the lowering of the fuel efficiency due to the correction to increase the boost pressure can be reduced.

The control device may further include an oil pan provided to a lower part of the engine body. The controller may execute the correction of the target boost pressure when an amount of water in the oil pan is at or above a given determination water amount.

The water contained in the blowby gas contains water evaporated from the oil pan. When the amount of water in the oil pan is small, the amount of water contained in the blowby gas is also small, and thus, the ice block is unlikely to form at the connecting part between the blowby gas passage and the intake passage. Accordingly, in this configuration, the correction to increase the boost pressure is not performed when the ice block is unlikely to form at the connecting part, whereas the boost pressure is increased only when the ice block is easily formed. Therefore, according to this configuration, the formation of the ice block at the connecting part can be prevented, while the lowering of the fuel efficiency due to the correction to increase the boost pressure can be reduced.

The controller may execute the correction of the target boost pressure when a temperature of engine oil collected in the oil pan is at or above a given determination temperature.

When the temperature of the engine oil collected in the oil pan is low, the amount of water evaporated from the engine oil is small, thereby the amount of water contained in the blowby gas is also small. Thus, the formation of the ice block at the connecting part between the blowby gas passage and the intake passage is unlikely to occur. Accordingly, in this configuration, the correction to increase the boost pressure is not performed when the ice block is unlikely to form at the connecting part, whereas the boost pressure is increased only when the ice block is easily formed. Therefore, according to this configuration, the formation of the ice block at the connecting part can be prevented, while the lowering of the fuel efficiency due to the correction to increase the boost pressure can be reduced.

The controller may set the target boost pressure at a basic target boost pressure and inhibit a correction of the target boost pressure to be higher than the basic target boost pressure when any of the following four conditions is satisfied: (1) the ambient temperature is at or above the determination temperature; (2) the engine is operated in a range where an engine speed is at or above a given reference speed, and an engine load is below a given reference load; (3) an amount of water in an oil pan is below a given determination water amount; and (4) a temperature of engine oil is below a given determination oil temperature.

When all of the four conditions are satisfied, the controller may correct the target boost pressure to be higher than the basic target boost pressure that is the target boost pressure when any of the four conditions is satisfied.

DETAILED DESCRIPTION OF THE DISCLOSURE (1) Overall Configuration of Engine

Figure 1:
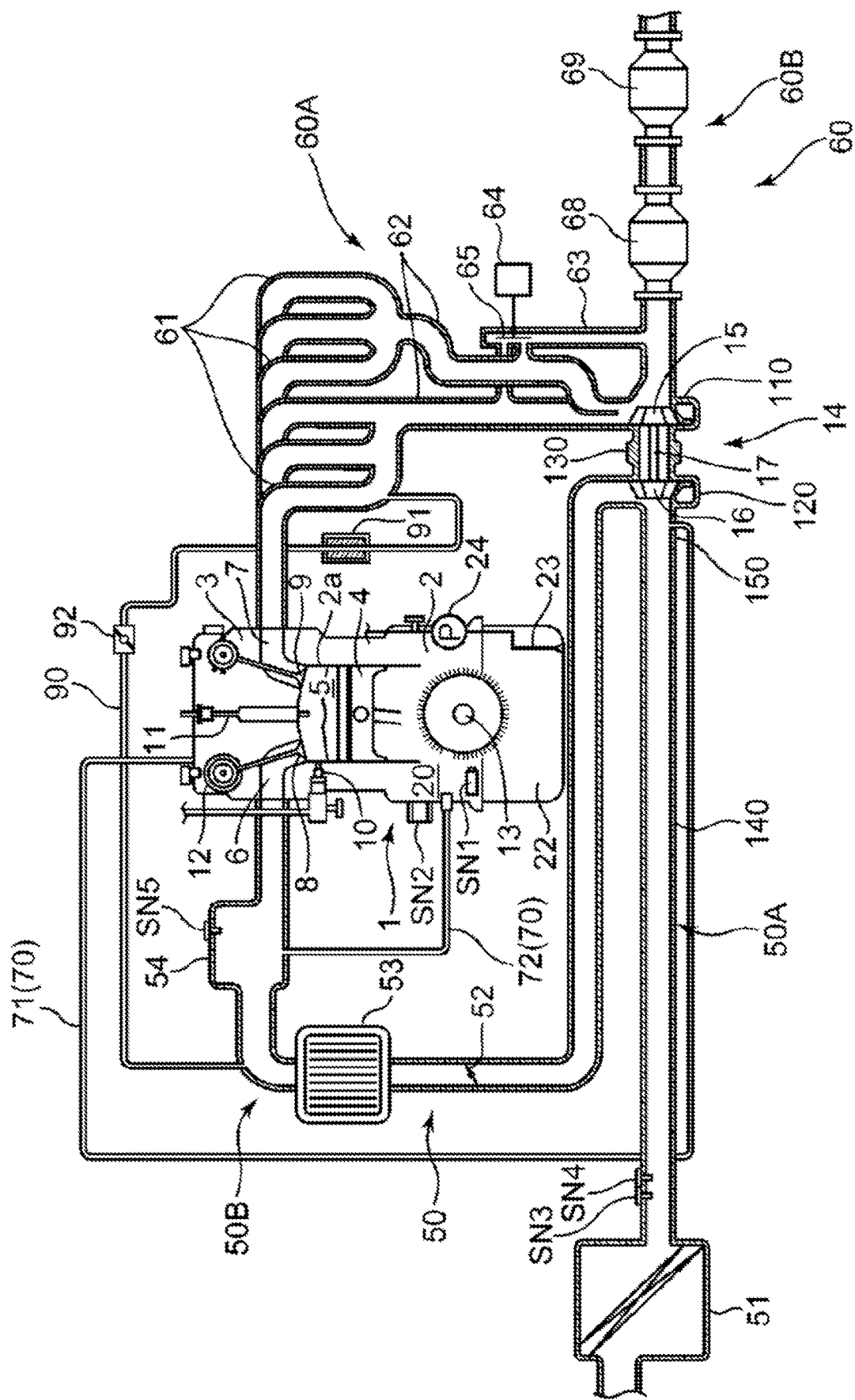
FIG. 1 is a view illustrating a configuration of an engine according to one embodiment of the present disclosure.

FIG. 1 is a schematic view illustrating a configuration of an engine to which an engine control device according to one embodiment of the present disclosure is applied. The engine is mounted to a vehicle, such as an automobile. The engine is provided with an engine body 1 in which cylinders 2a are formed, an intake passage 50 through which air (intake air) to be introduced into the engine body 1 passes, and an exhaust passage 60 through which exhaust gas discharged from the engine body 1 passes. In this embodiment, the engine body 1 is a four-stroke straight-six engine, having six cylinders 2a which are aligned in a direction perpendicular to the drawing sheet of FIG. 1.

The engine body 1 is provided with a cylinder block 2 in which the cylinders 2a are formed, a cylinder head 3 which is provided to an upper surface of the cylinder block 2, and pistons 4 each reciprocatably inserted into the cylinder 2a. A combustion chamber 5 is defined above the piston 4, and a crankcase 20 which accommodates a crankshaft 13 is defined in the cylinder block 2 below the combustion chamber 5. An oil pan 22 is provided to a lower part the engine body 1. The oil pan 22 collects engine oil as lubricating oil which lubricates each part of the engine body 1. The engine oil in the oil pan 22 is sent to each part of the engine body 1 by an oil pump 24 provided to an oil passage 23 connecting the oil pan 22 to each part of the engine body 1.

Injectors 10 which inject fuel into the respective combustion chambers 5 are attached the cylinder block 2. Spark plugs 11 which ignite a mixture gas (mixture gas of fuel and air) inside the respective combustion chambers 5 by spark discharge, are attached to the cylinder head 3. The cylinder head 3 is provided with intake ports 6 through which air is introduced into the respective combustion chambers 5, intake valves 8 which open and close the respective intake ports 6, exhaust ports 7 through which exhaust gas generated in the respective combustion chambers 5 is discharged, and exhaust valves 9 which open and close the respective exhaust ports 7. The intake valves 8 are driven by an intake-valve driving mechanism 12, and the intake-valve driving mechanism 12 is provided with an intake variable-valve-timing mechanism which changes the open and close timings of the intake valves 8. The intake variable-valve-timing mechanism changes the open and close timings of the intake valves 8 so as to change an amount of intake air flowing into the cylinders 2a.

In this embodiment, the engine is an engine with a turbocharger, and is provided with a turbocharger 14 having a turbine 15 which is provided to the exhaust passage 60 and driven by exhaust gas, a compressor 16 which is provided to the intake passage 50 and rotary driven by the turbine 15 to boost intake air, and a coupling shaft 17 coupling the turbine 15 and the compressor 16.

The turbocharger 14 is provided with a turbine housing 110 defining a part of the exhaust passage 60 to accommodate the turbine 15, a compressor housing 120 defining a part of the intake passage 50 to accommodate the compressor 16, and a center housing 130 accommodating the coupling shaft 17. Below, a part of the intake passage 50 upstream of the compressor housing 120 is referred to as an "upstream intake passage 50A," and a part of the intake passage 50 downstream of the compressor housing 120 is referred to as a "downstream intake passage 50B." Moreover, a part of the exhaust passage 60 upstream of the turbine housing 110 is referred to as an "upstream exhaust passage 60A," and a part of the exhaust passage 60 downstream of the turbine housing 110 is referred to as a "downstream exhaust passage 60B."

The upstream intake passage 50A is provided with an air cleaner 51. The downstream intake passage 50B is provided with, from the upstream, a throttle valve 52, an intercooler 53, and a surge tank 54. Basically, air from which dust, etc. is removed by the air cleaner 51, and which is compressed by the compressor 16 and then cooled by the intercooler 53, is introduced into the combustion chamber 5. The throttle valve 52 is a valve openable and closable of the intake passage 50, and is adjustable of the amount of intake air passing through the intake passage 50 according to the opening of the throttle valve 52. In detail, the throttle valve 52 opens and closes the intake passage 50 by being driven by a motor (not illustrated).

The intake passage 50 is connected to a blowby gas recirculating passage 70 which introduces blowby gas (i.e., gas leaked from the combustion chamber 5 to inside the engine body 1, in detail, inside the crankcase 20) into the intake passage 50. In this embodiment, two passages (a blowby gas passage 71 and a sub blowby gas passage 72) are provided to the engine as the blowby gas recirculating passage 70.

The blowby gas passage 71 is connected to the cylinder head 3 and the upstream intake passage 50A, and communicates the internal space of the cylinder head 3, which constitutes the engine body 1, with the upstream intake passage 50A. The blowby gas passage 71 is connected to a part of the upstream intake passage 50A near the compressor 16.

The sub blowby gas passage 72 is connected to the cylinder block 2 and the downstream intake passage 50B, and communicates the internal space of the cylinder block 2, which constitutes the engine body 1, with the downstream intake passage 50B. In FIG. 1, the sub blowby gas passage 72 is connected to the surge tank 54.

The upstream exhaust passage 60A includes independent exhaust passages 61 each connected to the exhaust port 7 of the corresponding cylinder 2a, and a collective passage 62 into which the plurality of independent exhaust passages 61 are combined. The collective passage 62 is coupled at its downstream end to the turbine housing 110. In this embodiment, six independent exhaust passages 61 are provided to the upstream exhaust passage 60A corresponding to the six cylinders 2a. Moreover, three independent passages 61 are combined into one collective passage 62, thus the upstream exhaust passage 60A having two collective passages 62. The two collective passages 62 are each coupled at its downstream end to the turbine housing 110.

The downstream exhaust passage 60B is provided with, from the upstream, a catalytic converter 68 in which a catalyst (e.g., a three-way catalyst) is built, and a GPF (Gasoline Particulate Filter) 69.

The exhaust passage 60 is provided with a bypass passage 63 which communicates the upstream exhaust passage 60A with the downstream exhaust passage 60B while bypassing the turbine 15. A part of the exhaust gas inside the upstream exhaust passage 60A passes through the bypass passage 63 to be flown to the downstream exhaust passage 60B without passing the turbine 15. The bypass passage 63 is connected to a part of the downstream exhaust passage 60B upstream of the catalytic converter 68. Moreover, the bypass passage 63 is branched into two passages on the upstream exhaust passage 60A side, and the two branched passages are connected to the two collective passages 62, respectively. The bypass passage 63 is provided with a wastegate valve 65 which is driven by a motor 64 to open and close the bypass passage 63. In FIG. 1, the branched passages are simultaneously opened and closed by a single wastegate valve 65.

The opening of the wastegate valve 65 can be changed to be fully closed, fully opened, and an arbitrary opening therebetween. An amount of exhaust gas passing through the bypass passage 63, and an amount of exhaust gas passing through the turbine 15 are changed according to the opening of the wastegate valve 65. As the amount of exhaust gas passing through the turbine 15 changes, a boost pressure of the turbocharger 14 (a pressure of intake air (air) compressed by the compressor 16 of the turbocharger 14, hereinafter, referred to as a "boost pressure") changes. In detail, when the opening of the wastegate valve 65 is reduced (brought to the closing side), the amount of exhaust gas passing through the bypass passage 63 decreases and the amount of exhaust gas passing through the turbine 15 increases. As a result, a rotary-driving force of the compressor 16 applied by the turbine 15 increases, thus the boost pressure becoming higher. On the other hand, when the opening of the wastegate valve 65 is increased (brought to the opening side), the amount of exhaust gas passing through the bypass passage 63 increases and the amount of exhaust gas passing through the turbine 15 decreases. As a result, the rotary-driving force of the compressor 16 applied by the turbine 15 decreases, thus the boost pressure becoming lower. As described above, in this embodiment, the boost pressure of the turbocharger 14 is changed according to the opening of the wastegate valve 65, and the wastegate valve 65 and the bypass passage 63 to which the wastegate valve 65 is provided, are an example of a "boost pressure changer" in the present disclosure.

The engine is provided with an exhaust gas recirculation (EGR) device which recirculates a part of the exhaust gas to the intake air, and has an EGR passage 90 connecting the upstream exhaust passage 60A to the downstream intake passage 50B, an EGR cooler 91 which cools EGR gas passing through the EGR passage 90, and an EGR valve 92 which opens and closes the EGR passage 90. In FIG. 1, the EGR passage 90 connects a part of the upstream exhaust passage 60A upstream of the connecting part with the bypass passage 63, to a part of the downstream intake passage 50B between the intercooler 53 and the surge tank 54.

The engine is provided with various sensors. In detail, the cylinder block 2 is provided with an engine speed sensor SN1 which detects a rotational angle of the crankshaft 13 (i.e., an engine speed), and an engine water temperature sensor SN2 which detects the temperature of engine coolant (i.e., engine water) which passes through inside the engine body 1 to cool the engine body 1. The upstream intake passage 50A is provided, at a part downstream of the air cleaner 51, with an airflow sensor SN3 which detects a flow rate of intake air passing through the intake passage 50, and an intake temperature sensor SN4 which detects the temperature of the intake air passing through the part where the intake temperature sensor SN4 is provided. The surge tank 54 is provided with an intake pressure sensor SN5 which detects the pressure inside the surge tank 54 (intake pressure).

(2) Connecting Structure of Blowby Gas Passage and Intake Passage

Figure 2:
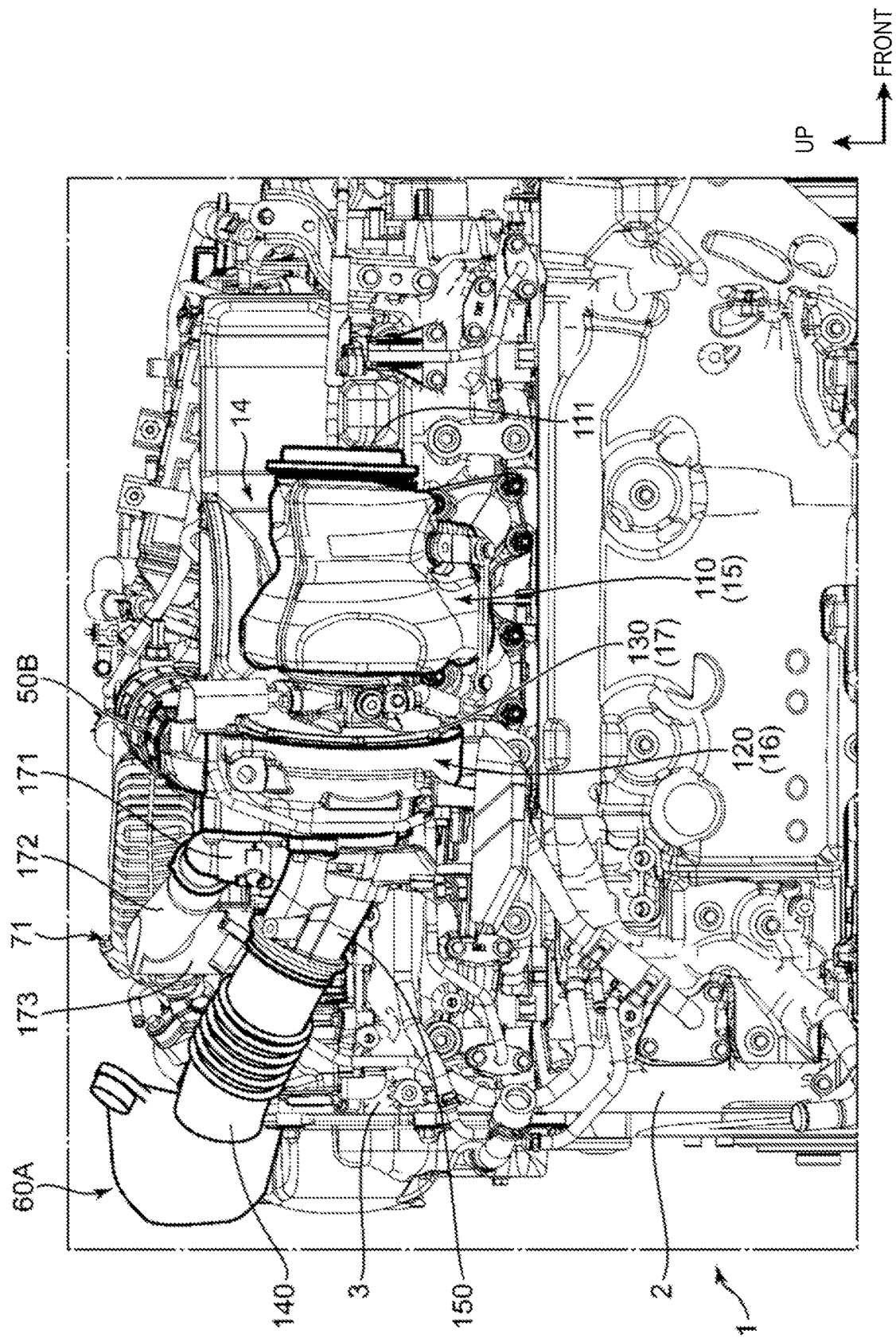
FIG. 2 is a side view of the engine.
Figure 3:
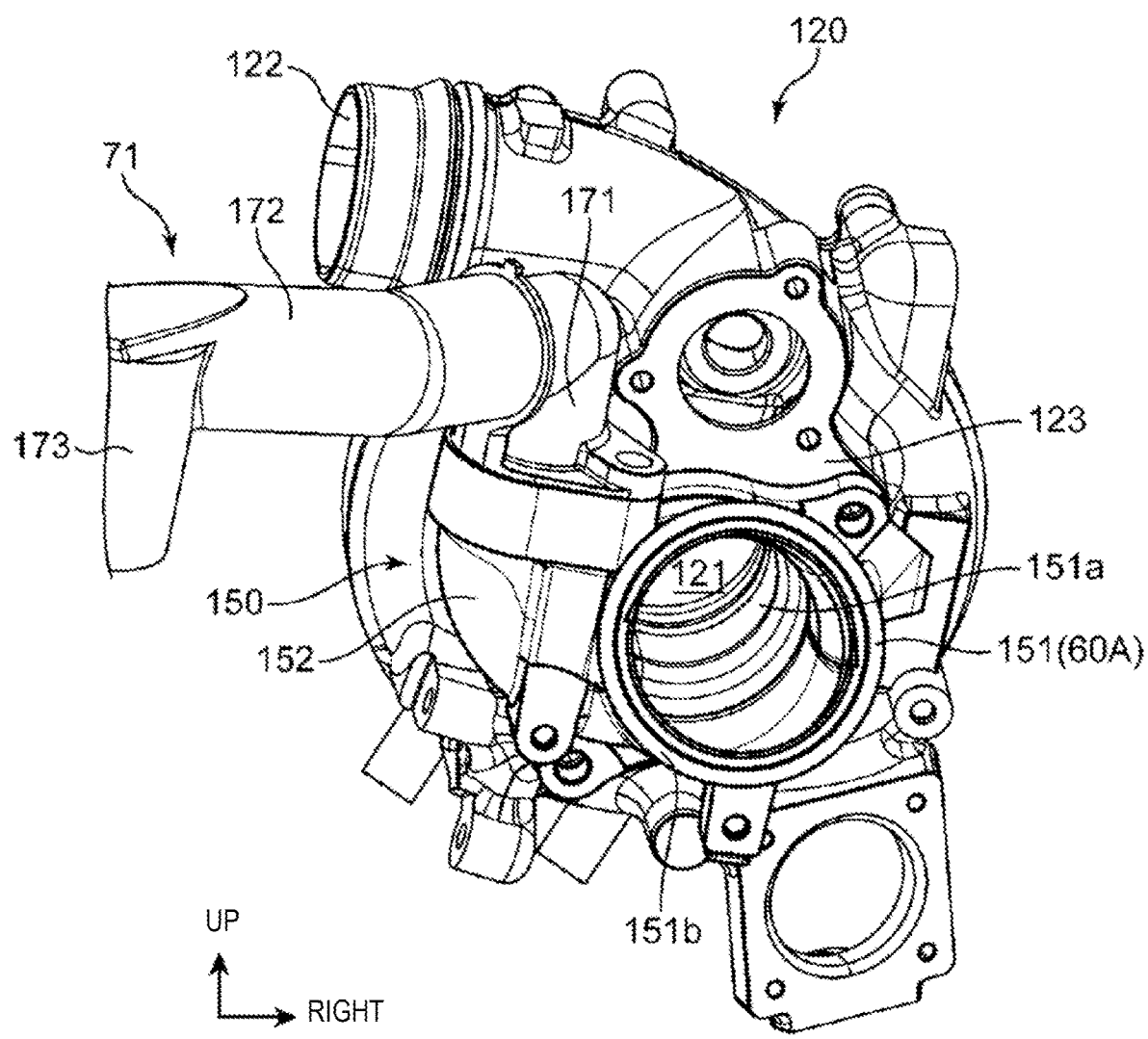
FIG. 3 is a perspective view of a periphery of a compressor housing and an air pipe.
Figure 4:
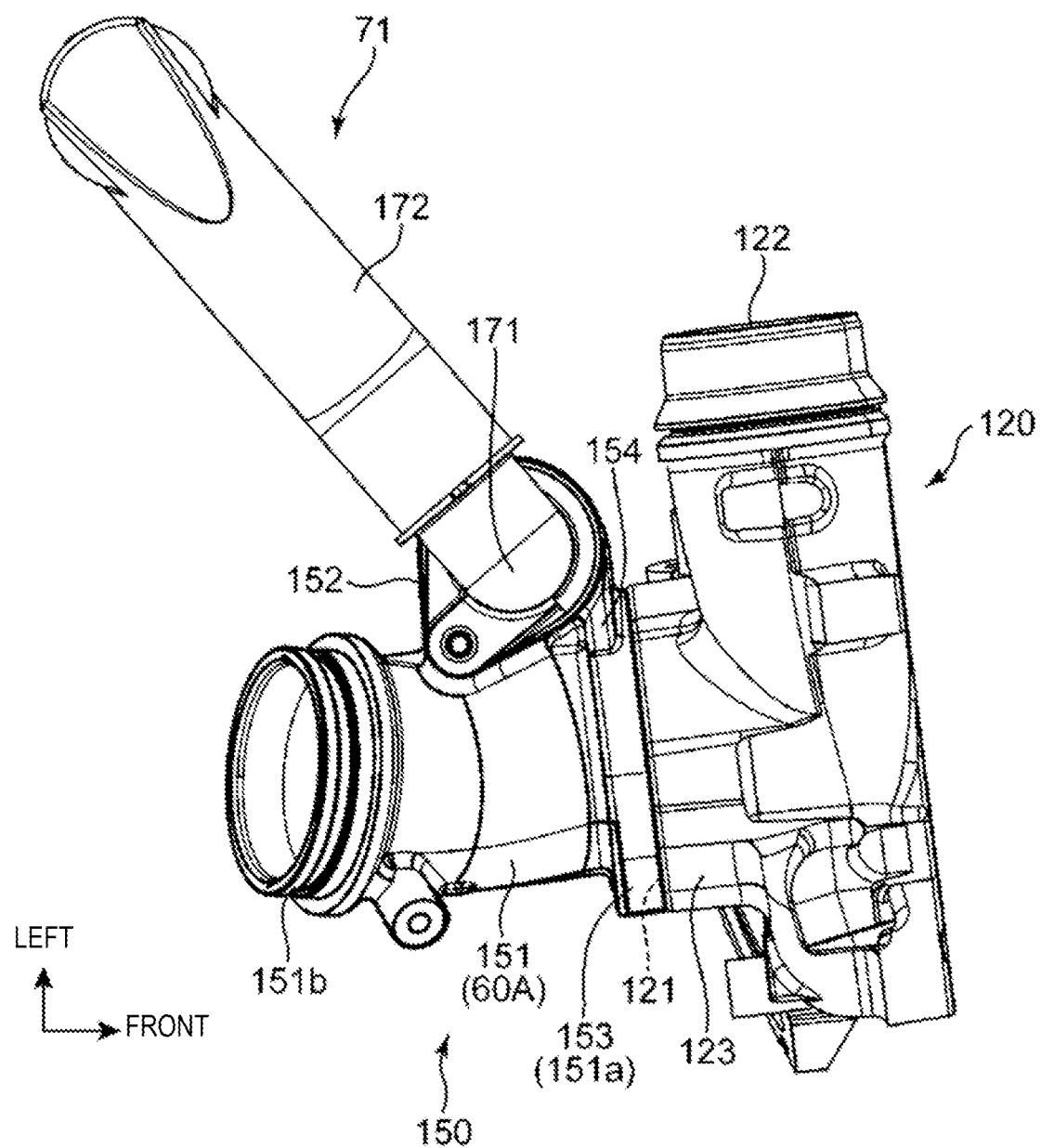
FIG. 4 is a top view of the periphery of the compressor housing and the air pipe.
Figure 5:
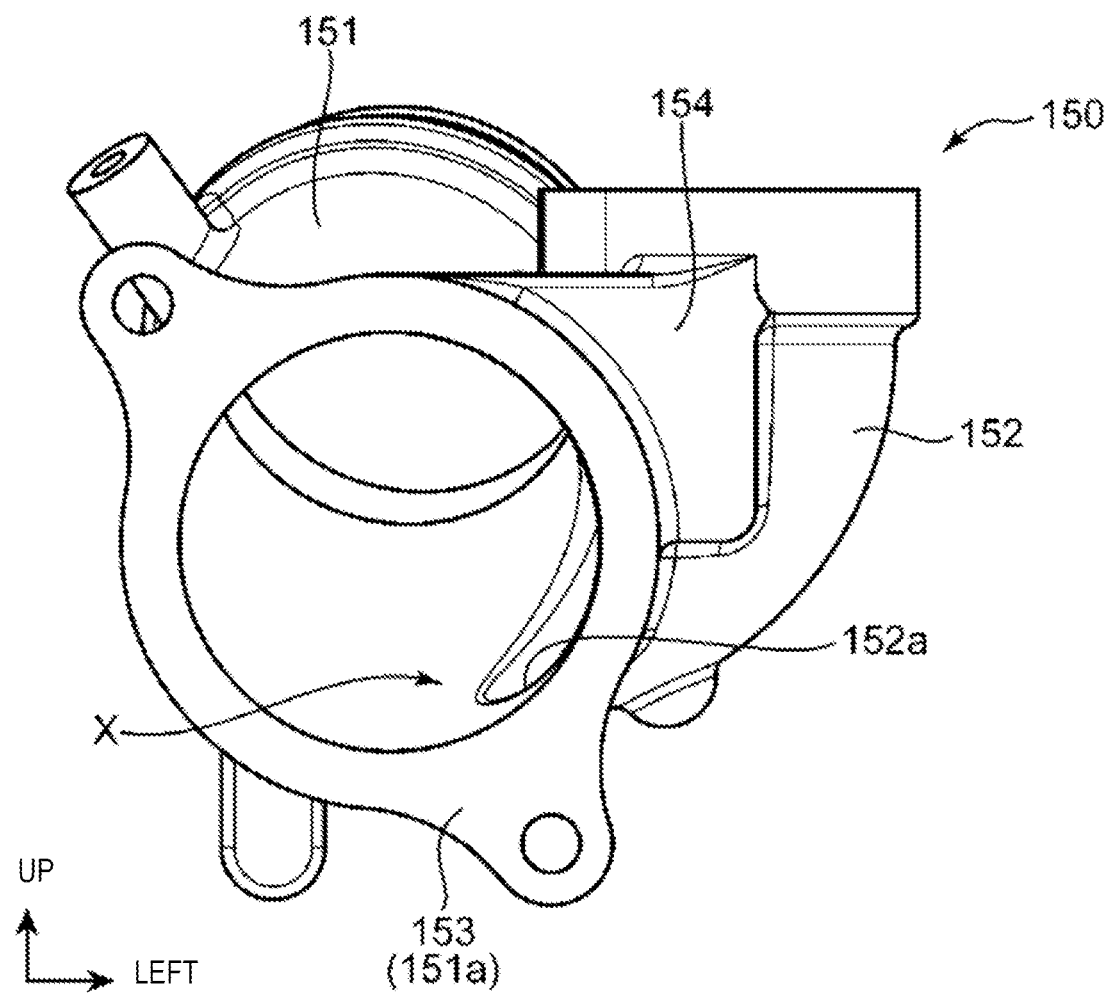
FIG. 5 is a front view of the air pipe.

Next, a connecting structure of the blowby gas passage 71 and the intake passage 50 is described with reference to FIGS. 2 to 5. FIG. 2 is a side view partially illustrating a periphery of the engine body 1. FIG. 3 is a perspective view of a periphery of the compressor housing 120 and an air pipe 150 (described later). FIG. 4 is a top view corresponding to FIG. 3. FIG. 5 is a front view of the air pipe 150. In the following description and FIGS. 2 to 5, a direction in which the cylinders 2a are aligned (a left-and-right direction of the drawing sheet of FIG. 2) indicates a front-and-rear direction (the right side of the drawing sheet of FIG. 2 is the front side). Moreover, a direction perpendicular to the front-and-rear direction and an up-and-down direction indicates a left-and-right direction (the closer side of the drawing sheet of FIG. 2 and the exhaust port 7 side (i.e., the exhaust side) is the right side).

As illustrated in FIG. 2, the turbocharger 14 is provided adjacent to the engine body 1 on the right side in a posture where the turbine housing 110 (the turbine 15), the center housing 130 (the coupling shaft 17), and the compressor housing 120 (the compressor 16) are lined up in this order from the front (i.e., the coupling shaft 17 extends in the front-and-rear direction). In this embodiment, the center housing 130 is made of cast iron, and the compressor housing 120 is aluminum-alloy casting. Moreover, the turbine housing 110 is made of heat resistance cast steel.

An intake introducing port 121 of the compressor housing 120 (an opening from which intake air is introduced into the compressor housing 120) opens rearwardly from a rear-end part of the compressor housing 120, and an exhaust discharging port 111 of the turbine housing 110 (an opening from which exhaust gas is discharged outside the turbine housing 110) opens forwardly from a front-end part of the turbine housing 110. Moreover, an intake discharging port 122 of the compressor housing 120 (an opening from which intake air is discharged outside the compressor housing 120) opens leftwardly at an upper part of the compressor housing 120.

The compressor housing 120 is coupled at its rear-end part to the air pipe 150. The air pipe 150 is comprised of an intake passage part 151 constituting a downstream-end part of the upstream intake passage 50A, and a blowby gas passage part 152 constituting a downstream-end part of the blowby gas passage 71. That is, in this embodiment, the downstream-end part of the upstream intake passage 50A and the downstream-end part of the blowby gas passage 71 are integrally provided to the air pipe 150, and this air pipe 150 is directly connected to the compressor housing 120. The air pipe 150 is integrally formed by aluminum-alloy casting, and a thermal conductivity thereof is about 200 W/(m·K) similarly to aluminum alloy.

The intake passage part 151 has a cylindrical shape extending in the front-and-rear direction, and communicates at its front-end part 151a with the intake introducing port 121 of the compressor housing 120. The intake passage part 151 inclines forwardly downwardly. A part 140 of the upstream intake passage 50A on the upstream side of the intake passage part 151 is connected to a rear-end part 151b of the intake passage part 151. The part 140 has a part extending rearwardly from the rear-end part 151b, a part extending leftwardly from a rear-end part of the rearwardly extending part while passing above the engine body 1, and a part extending forwardly from a left-end part of the leftwardly extending part to be coupled to the air cleaner 51.

The blowby gas passage part 152 has a cylindrical shape, and extends upwardly from the left side of an outer circumferential surface of the intake passage part 151. The blowby gas passage part 152 curves to bulge leftwardly from the outer circumferential surface of the intake passage part 151. The inner diameter of the blowby gas passage part 152 is set to be smaller than the inner diameter of the intake passage part 151. The intake passage part 151 is formed, on its inner circumferential surface, with a communicating port 152a which communicates with an internal space of the blowby gas passage part 152. Blowby gas passes through the communicating port 152a to be merged with intake air inside the intake passage part 151. The communicating port 152a is formed at a front-side part of the intake passage part 151 (i.e., on a closer side to the compressor housing 120 in the front-and-rear direction), and the blowby gas passage part 152 extends upwardly from the part of the intake passage part 151 near the compressor housing 120. According to this configuration, it is achieved that the blowby gas passage 71 is connected to the intake passage 50 at the position near the compressor housing 120 and the compressor 16. Below, a connecting part X of the air pipe 150 between the blowby gas passage part 152 and the intake passage part 151 around the communicating port 152a (the connecting part X between the blowby gas passage 71 and the intake passage 50) is simply be referred to as the "connecting part X" suitably.

A part of the blowby gas passage 71 upstream of the blowby gas passage part 152 is connected to an upper-end part of the blowby gas passage part 152, and has a first part 171 extending upwardly from the upper-end part, a second part 172 extending leftwardly from an upper-end part of the first part 171, and a third part 173 extending downwardly from a left-end part of the second part 172 and coupled to an upper surface of the cylinder head 3. Note that the second part 172 is inclined rightwardly downwardly.

The air pipe 150 has a second flange part 153 which is provided to the front-end part 151a of the intake passage part 151 and protruding outwardly in the radial direction of the intake passage part 151. The air pipe 150 is directly fixed to the rear-end part of the compressor housing 120 by the second flange part 153 being coupled, with a bolt, to a first flange part 123 which is provided to the rear-end part of the compressor housing 120.

The air pipe 150 is provided with a rib part 154 which connects the second flange part 153 to a front part of an outer circumferential surface of the blowby gas passage part 152. As illustrated in FIG. 5, the rib part 154 has a substantially trapezoid shape, and connects a left upper part of the second flange part 153 to a right-side part of the front side of the outer circumferential surface of the blowby gas passage part 152. Note that the second flange part 153 and the rib part 154 are also formed integrally with the blowby gas passage part 152 and the intake passage part 151.

(3) Control of Boost Pressure

Figure 6:
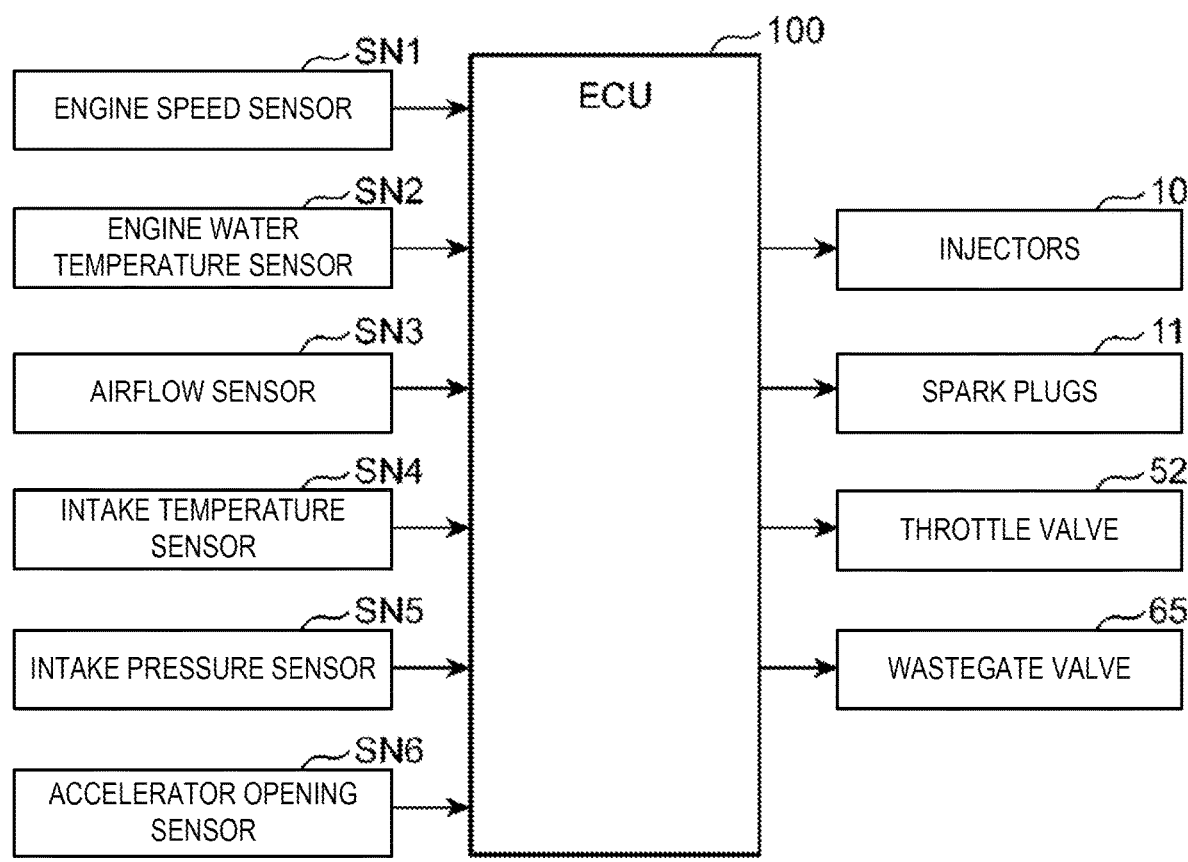
FIG. 6 is a diagram illustrating a control block.

Next, control of the boost pressure of the turbocharger 14 is described. FIG. 6 is a block diagram illustrating a control system of the engine. Each part of the engine, such as the injectors 10, the spark plugs 11, the throttle valve 52, and the wastegate valve 65, is controlled by an ECU (Engine Control Unit) 100 mounted on the vehicle. The ECU 100 is a well-known microprocessor comprised of a processor (i.e., a central processing unit (CPU)), memory such as ROM and RAM, an interface (I/F), etc. The ECU 100 is an example of a "controller" in the present disclosure.

The ECU 100 receives inputs of information from various sensors. For example, the ECU 100 is electrically connected to the engine speed sensor SN1, the engine water temperature sensor SN2, the airflow sensor SN3, the intake temperature sensor SN4, and the intake pressure sensor SN5, and receives input signals (the engine speed, the intake air amount, the engine water temperature, the intake air temperature, and the intake air pressure) from these sensors. Moreover, the vehicle is provided with an accelerator opening sensor SN6 which detects an opening of an accelerator pedal (not illustrated) which is operated by a driver, and this detection result is also inputted into the ECU 100.

Figure 7:
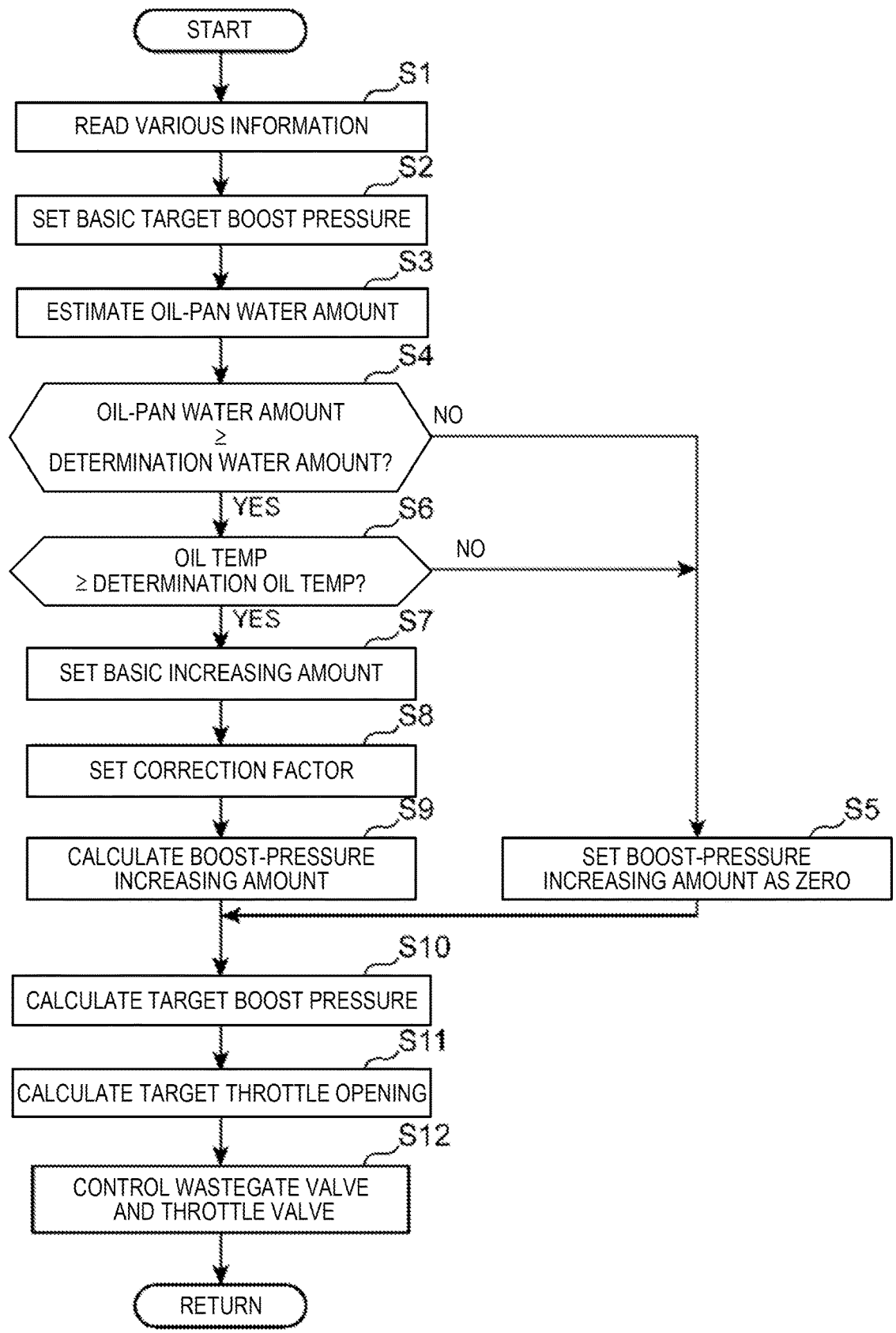
FIG. 7 is a flowchart illustrating control of a boost pressure.

FIG. 7 is a flowchart illustrating the control of the boost pressure executed by the ECU 100. Note that each step illustrated in FIG. 7 is executed during the operation of the engine.

First, the ECU 100 reads the various information detected by the sensors SN1 to SN6 (step S1).

Next, the ECU 100 sets a basic target boost pressure (step S2). The basic target boost pressure is a basic value of a target boost pressure (a target value of the boost pressure). The ECU 100 sets the basic target boost pressure based on, for example, the engine speed detected by the engine speed sensor SN1 and an engine load. Note that the ECU 100 separately calculates the engine load based on the opening of the accelerator pedal detected by the accelerator opening sensor SN6 and the engine speed, etc.

Figure 8:
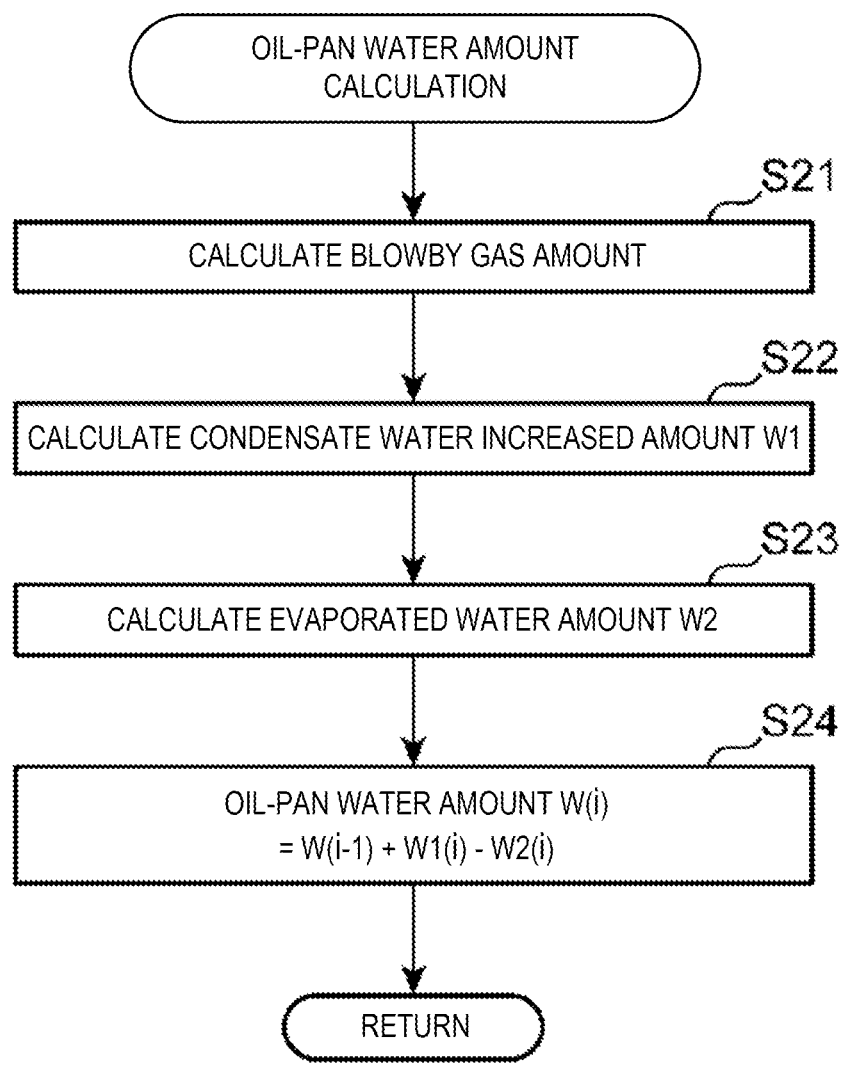
FIG. 8 is a flowchart illustrating processing of calculating an amount of water inside an oil pan.

Next, the ECU 100 calculates an amount of water in the oil pan, which is the weight of liquid water collected in the oil pan 22 (hereinafter, referred to as an "oil-pan water amount") (step S3). The ECU 100 calculates the oil-pan water amount by adding up values each obtained by subtracting the weight of water evaporated from the oil pan 22, from the weight of liquid water added to the oil pan 22. In detail, the ECU 100 calculates the oil-pan water amount by executing a subroutine illustrated in the flowchart of FIG. 8.

First, the ECU 100 calculates an amount of blowby gas per unit time (e.g., per operation cycle), that is, the weight of gas leaked from the combustion chamber 5 to the crankcase 20 per unit time (step S21). In detail, the ECU 100 calculates the current amount of blowby gas based on the engine speed, the engine load, etc. Next, the ECU 100 calculates an increased amount W1 of condensate water in the oil pan 22 (an amount of increase in the weight of liquid water in the oil pan 22) (step S22). In detail, the ECU 100 calculates a value, as the increased amount W1 of the condensate water, by subtracting an amount of saturated water vapor inside the crankcase 20 from a value obtained by multiplying a given coefficient to the blowby gas amount calculated at step S11. The coefficient may be set to 0.075, for example. Moreover, the amount of saturated water vapor is set and stored in the ECU 100 in advance.

Next, the ECU 100 calculates an amount of decrease in the weight of the condensate water in the oil pan 22 caused by evaporation, which is an evaporated amount W2 of the water in the oil pan 22 (step S23). The ECU 100 calculates the evaporated water amount W2 based on the temperature of the engine oil in the oil pan 22 (hereinafter, suitably referred to as an "oil temperature"), and a current oil-pan water amount W (the oil-pan water amount W calculated one operation cycle before). In this embodiment, the ECU 100 estimates the oil temperature based on the engine water temperature detected by the engine water temperature sensor SN2, and uses this oil temperature to calculate the evaporated water amount W2. Note that the ECU 100 estimates the oil temperature to be higher as the engine water temperature increases. In detail, when the oil temperature is below 50° C., the ECU 100 sets the evaporated water amount W2 to be a given amount set in advance, regardless of the oil temperature. On the other hand, when the oil temperature is at 50° C. or above, the ECU 100 calculates the evaporated water amount W2 to be larger as the oil temperature increases.

Finally, the ECU 100 calculates the current oil-pan water amount W(i) based on "W(i)=W(i−1)+W1(i)−W2(i)" (step S24). Note that "i" is the number of operation cycles, "W(i−1)" is the oil-pan water amount W calculated one operation cycle before, "W1(i)" is the increased amount W1 of the condensate water calculated at step S22 during this operation cycle, and "W2(i)" is the evaporated water amount W2 calculated at step S23 during this operation cycle.

Referring again to FIG. 7, after calculating of the oil-pan water amount, the ECU 100 determines whether the calculated oil-pan water amount is at or above a determination water amount (step S4). The determination water amount is set to be larger than zero and stored in the ECU 100 in advance. The determination water amount is set to about 50 cc, for example. If the determination at step S4 is NO, and the oil-pan water amount is below the determination water amount, the ECU 100 sets a boost-pressure increasing amount to zero (step S5). The boost-pressure increasing amount is an increasing amount of boost pressure with respect to the basic target boost pressure of the target boost pressure.

On the other hand, if the determination at step S4 is YES, and the oil-pan water amount is at or above the determination water amount, the ECU 100 determines whether the oil temperature is at or above a determination oil temperature (step S6). As described above, in this embodiment, the ECU 100 estimates the oil temperature based on the engine water temperature, and executes the determination at step S6 based on this estimated oil temperature. The determination oil temperature is set and stored in the ECU 100 in advance. The determination oil temperature is set to about 50° C., for example.

If the determination at step S6 is NO, and the oil temperature is below the determination oil temperature, the ECU 100 proceeds to step S5 where the boost-pressure increasing amount is set to zero.

On the other hand, if the determination at step S6 is YES, and the oil temperature is at or above the determination oil temperature, the ECU 100 sets a basic value of the boost-pressure increasing amount (basic increasing amount) (step S7).

Figure 9:
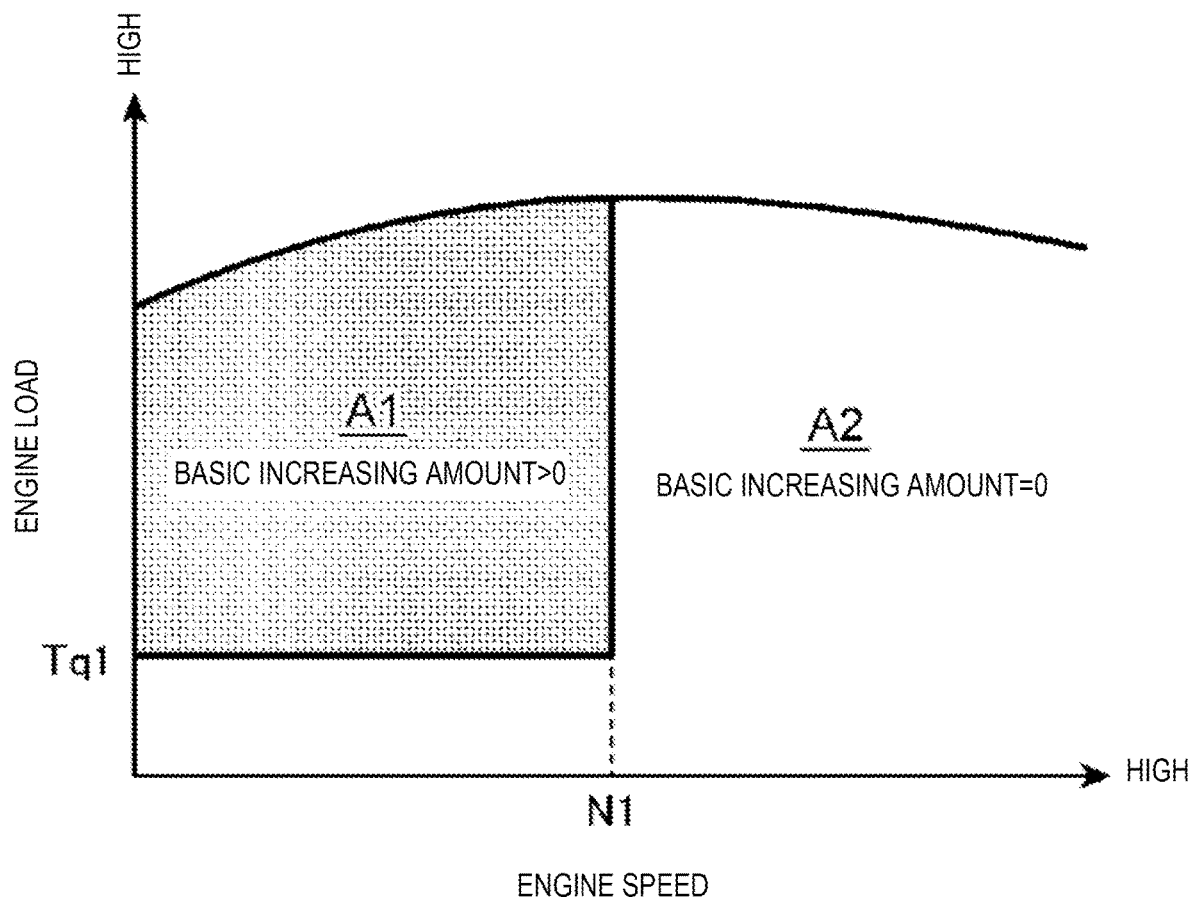
FIG. 9 is a map illustrating an operation range of the engine.

The ECU 100 sets the basic increasing amount based on the engine speed and the engine load. As illustrated in FIG. 9 where the operation ranges of the engine are illustrated, the basic increasing amount is set to a value larger than zero in a first range A1 in the entire operation range of the engine, where the engine speed is below a given reference speed N1, and the engine load is at or above a given reference load Tq1. On the other hand, in a second range A2 other than the first range A1, the basic increasing amount is set to zero. For example, the basic increasing amount is set within a range between 0-20 kPa in the first range A1. The reference speed N1 is set to 2,500 rpm, for example.

Figure 10:
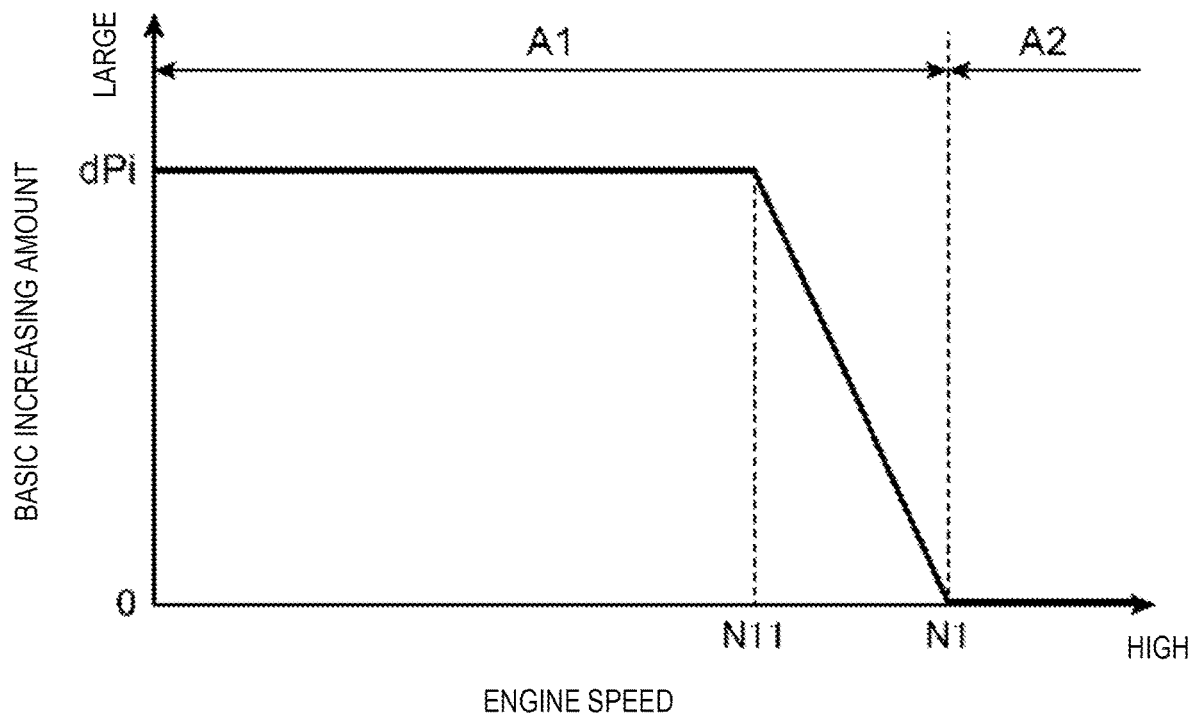
FIG. 10 is a graph illustrating a relationship between an engine speed and a basic increasing amount.

FIG. 10 is a graph illustrating a relationship between the engine speed and the basic increasing amount. In this embodiment, the relationship between the engine speed and the basic increasing amount as illustrated in FIG. 10 is applied regardless of the engine load. As illustrated in FIG. 10, in this embodiment, when the engine speed is at or below a given engine speed N11 (e.g., 2,000 rpm), the basic increasing amount is set to a constant value dPi (e.g., 20 kPa) regardless of the engine speed. On the other hand, when the engine speed is larger than the speed N11, the basic increasing amount is set to be smaller in proportion to the engine speed.

In this embodiment, the basic increasing amount is set in advance for each engine speed and each engine load, and stored as a map in the ECU 100. The ECU 100 extracts from the map a value corresponding to the current engine speed and engine load, and sets the value as the basic increasing amount.

Referring again to FIG. 7, after setting the basic increasing amount, the ECU 100 calculates a correction factor K used for correcting the basic increasing amount, based on the ambient temperature (step S8). Here, the ambient temperature is the temperature outside the engine and outside the vehicle. However, the ambient temperature is almost the same as the intake temperature detected by the intake temperature sensor SN4, and thus, in this embodiment, the ECU 100 uses the intake temperature detected by the intake temperature sensor SN4 as the ambient temperature to calculate the correction factor K. When the ambient temperature (intake temperature) is at or above a determination temperature Ta1, the correction factor K is set to zero, and when the ambient temperature is below the determination temperature Ta1, the correction factor K is set to a value greater than 0 and at or less than 1. The determination temperature Ta1 is set and stored in the ECU 100 in advance. The determination temperature Ta1 is set to −10° C., for example.

Figure 11:
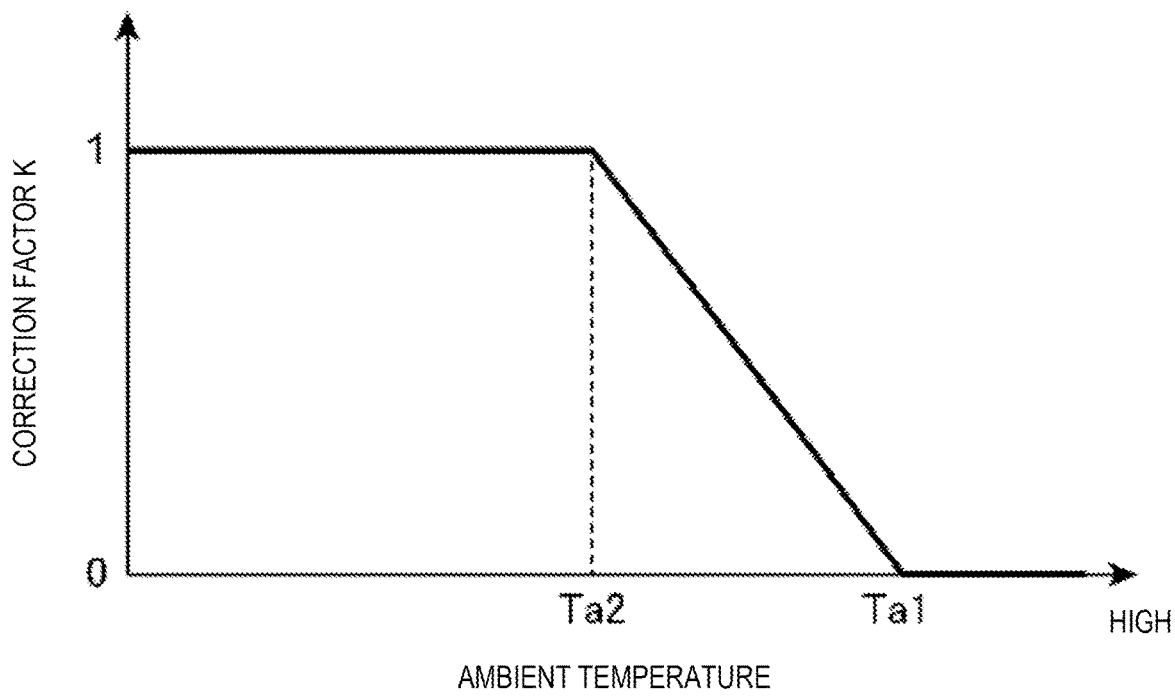
FIG. 11 is a graph illustrating a relationship between an ambient temperature and a correction factor.

FIG. 11 is a view illustrating a relationship between the ambient temperature (intake temperature) and the correction factor K according to this embodiment. As illustrated in FIG. 11 and as described above, when the ambient temperature is at or above the determination temperature Ta1, the correction factor K is set to zero, and when the ambient temperature is below the determination temperature Ta1, the correction factor K is set to a value larger than zero. Moreover, as illustrated in FIG. 11, in this embodiment, the correction factor K is set to be larger as the ambient temperature decreases. In the example of FIG. 11, when the ambient temperature is at or below a given temperature Ta2 lower than the determination temperature Ta1, the correction factor K is set to 1 regardless of the ambient temperature. On the other hand, when the ambient temperature is higher than the temperature Ta2, the correction factor K is set to be smaller in proportion to the ambient temperature. The given temperature Ta2 is set to −20° C., for example.

In this embodiment, the correction factor K is set in advance for each ambient temperature (intake temperature) as illustrated in FIG. 11, and stored as a map in the ECU 100. The ECU 100 extracts from the map a value corresponding to the current intake temperature detected by the intake temperature SN4, and sets the value as the correction factor K.

Referring again to FIG. 7, after setting the correction factor K, the ECU 100 calculates the boost-pressure increasing amount based on the basic increasing amount set at step S7 and the correction factor K set at step S8. In detail, the ECU 100 calculates the boost-pressure increasing amount by multiplying the basic increasing amount by the correction factor K. That is, the boost-pressure increasing amount is calculated based on "boost-pressure increasing amount= (basic increasing amount)×(correction factor)."

Here, the basic increasing amount in the second range A2 is zero, and the correction factor K is zero when the ambient temperature (intake temperature) is at or above the determination temperature Ta1. Therefore, when the ambient temperature is at or above the determination temperature Ta1, or when the engine is operated in the second range A2, the boost-pressure increasing amount is zero.

Next, the ECU 100 sets a final target boost pressure based on the basic target boost pressure calculated at step S2 and the boost-pressure increasing amount calculated at step S9 or step S5 (step S10). In detail, the ECU 100 sets as the final target boost pressure a value obtained by adding the boost-pressure increasing amount to the basic target boost pressure. Accordingly, when the boost-pressure increasing amount is zero, the target boost pressure is set to be the basic target boost pressure. On the other hand, when the boost-pressure increasing amount is larger than zero, the target boost pressure is set to a value larger than the basic target boost pressure by the boost-pressure increasing amount.

Next, the ECU 100 sets a target throttle opening which is a target value of the opening of the throttle valve 52 (step S11).

In detail, a basic value of the target throttle opening (basic target throttle opening) is set in advance for each engine speed and each target torque, and stored as a map in the ECU 100. The target torque is a target value of the engine torque, and successively calculated by the ECU 100 based on, for example, the opening of the accelerator pedal detected by the accelerator opening sensor SN6. The ECU 100 extracts from the map a value corresponding to the current engine speed and the target torque, and sets the value as the basic target throttle opening. Next, the ECU 100 determines whether the boost-pressure increasing amount is larger than zero. If the boost-pressure increasing amount is larger than zero, the ECU 100 sets the target throttle opening to be smaller than the basic target throttle opening (brought to the closing side). In this embodiment, the ECU 100 sets the target throttle opening to be smaller as the boost-pressure increasing amount increases. On the other hand, when the boost-pressure increasing amount is zero or smaller, the ECU 100 sets the basic target throttle opening as the target throttle opening. In this embodiment, the basic target throttle opening is set to be fully opened, and accordingly, the target throttle opening is set to be fully opened when the target throttle opening is set to the basic target throttle opening as the boost-pressure increasing amount is zero or smaller. On the other hand, when the target throttle opening is set to be smaller than the basic target throttle opening as the boost-pressure increasing amount is larger than zero, the target throttle opening is set to be smaller than the fully opened.

Next, the ECU 100 adjusts the opening of the wastegate valve 65 so that the boost pressure becomes the target boost pressure set at step S10 (step S12). In this embodiment, the ECU 100 adjusts the opening of the wastegate valve 65 so that the pressure detected by the intake pressure sensor SN5 provided to the surge tank 54 becomes the target boost pressure. Moreover, the ECU 100 adjusts the opening of the throttle valve 52 to be the target throttle opening set at step S11 (step S12), and ends the processing (returns to step S1).

Here, as described above, when the condition that the ambient temperature is at or above the determination temperature Ta1, or the condition that the engine is operated in the second range A2 is satisfied at step S7 or S8, the boost-pressure increasing amount is set to zero. Moreover, when the condition that the oil-pan water amount is below the determination water amount, or the condition that the oil temperature is below the determination oil temperature is satisfied, the boost-pressure increasing amount is set to zero at step S5. Accordingly, when any of the above four conditions is satisfied, the target boost pressure is set to the basic target boost pressure, and is not corrected (inhibited the correction) to be larger than the basic target boost pressure. On the other hand, when all of the above four conditions are satisfied, the boost-pressure increasing amount is set to be larger than zero, and the target boost pressure is set to be a value obtained by adding the boost-pressure increasing amount to the basic target boost pressure. That is, in this case, the target boost pressure is corrected to be higher than the basic target boost pressure (i.e., the target boost pressure in the case where any one of the above four conditions is satisfied).

Effects

As described above, in this embodiment, the blowby gas passage 71 is connected to the part of the intake passage 50 near the compressor 16. Therefore, a lot of thermal energy transferred to the compressor 16 and the compressor housing 120 from the exhaust gas at a high temperature passing through the turbine 15, via the turbine 15 and the turbine housing 110, can be supplied to the connecting part X (the connecting part between the intake passage 50 and the blowby gas passage 71). Moreover, during the operation of the engine, the exhaust gas at the high temperature constantly passes through the turbine 15. Therefore, even when the ambient temperature is low, the large thermal energy of the exhaust gas can be supplied to the connecting part X. As a result, it can be effectively prevented that the condensate water contained in the blowby gas is frozen, and an ice block (lump of ice) is formed at the connecting part X. Accordingly, the components downstream of the connecting part X can be prevented from being damaged by colliding with the ice block. In this embodiment, the compressor 16 can be prevented from being damaged due to the collision with the ice block although the compressor 16 is provided downstream of the connecting part X.

Moreover, while the target boost pressure is set to the basic target boost pressure when the ambient temperature is at or above the determination temperature Ta1, the target boost pressure is set to be higher than the basic target boost pressure when the ambient temperature is below the determination temperature Ta1. That is, when the ambient temperature is below the determination temperature Ta1, the target boost pressure is corrected to be higher than the target boost pressure in the case where the ambient temperature is at or above the determination temperature Ta1. When the target boost pressure is increased, the wastegate valve 65 is controlled to increase the boosting force of the turbocharger 14 so as to achieve the increased target boost pressure, and the temperature of the intake air further rises by being compressed by the compressor 16. When the compressor 16 raises the temperature of the intake air, the compressor 16 itself and the compressor housing 120 also increase in the temperature, and thus, the connecting part X located near the compressor 16 also increases in the temperature. Therefore, according to this embodiment, when the freezing of the condensate water and the formation of the ice block are likely to occur at the connecting part X of the air pipe 150 due to the low ambient temperature (below the determination temperature Ta1), the connecting part X can be further heated by utilizing the boosting force of the turbocharger 14. As a result, the possibility that the condensate water is frozen and the ice block is formed can sufficiently be reduced.

Particularly, in this embodiment, the air pipe 150 which is directly connected to the compressor housing 120 and has the intake passage part 151 constituting the downstream-end part of the upstream intake passage 50A, is provided with the blowby gas passage part 152 constituting the downstream-end part of the blowby gas passage 71. Furthermore, the intake passage 50 and the blowby gas passage 71 are connected to each other at the immediately upstream of the compressor housing 120. Therefore, the thermal energy of the exhaust gas transferred to the compressor housing 120 can effectively be transferred to the downstream-end part of the blowby gas passage 71, thus sufficiently raising the temperature of the connecting part X. Moreover, in this embodiment, the blowby gas passage part 152 is coupled through the rib part 154 to the second flange part 153 of the air pipe 150 which is fastened to the first flange part 123 of the compressor housing 120. Therefore, the thermal energy of the compressor housing 120 can efficiently be transferred to the blowby gas passage part 152, and the freezing of the condensate water and the formation of the ice block inside the blowby gas passage part 152 can effectively be prevented. Furthermore, since the air pipe 150 is the aluminum-alloy casting with a high heat conductivity, the thermal energy transferred from the compressor housing 120 to the blowby gas passage part 152 can be larger.

Here, when the engine load is low, the pressure inside the engine body 1 is low. Therefore, the flow of the blowby gas from the engine body 1 to the intake passage 50 through the blowby gas passage 71 almost stops, and the supply of the condensate water to the connecting part X almost stops. Accordingly, when the engine load is low, the freezing of the condensate water and the formation of the ice block are unlikely to occur at the connecting part X. Regarding to this, in this embodiment, as described above, the boost-pressure increasing amount is set to be larger than zero when the engine load is at or above the reference load Tq1, and the boost-pressure increasing amount is set to zero when the engine load is below the reference load Tq1. That is, the target boost pressure is corrected to be increased only when the engine load is at or above the reference load T1q and the ice block is likely to be formed at the connecting part X. Therefore, according to this embodiment, the formation of the ice block at the connecting part X can be sufficiently prevented, while the lowering of the fuel efficiency due to the correction to increase the target boost pressure can be reduced. More specifically, when the target boost pressure is increased and the opening of the wastegate valve 65 is brought to the closing side in order to achieve the increased target boost pressure, the amount of exhaust gas passing through the turbine 15 increases, which may increase a back pressure of the engine body 1 and degrade the fuel efficiency. Therefore, by suspending the correction to increase the target boost pressure when the engine load is below the reference load Tq1, and the freezing of the condensate water and the formation of the ice block are unlikely to occur, the freezing of the condensate water and the formation of the ice block can be prevented, while the fuel efficiency is prevented from degrading due to the control of bringing the opening of the wastegate valve 65 to the closing side in order to increase the boost pressure.

Moreover, the water contained in the blowby gas contains water evaporated from the oil pan 22. When the amount of water in the oil pan 22 is small, the amount of water contained in the blowby gas is also small, and thus, the freezing of the condensate water and the formation of the ice block are unlikely to occur at the connecting part X. Regarding to this, in this embodiment, the target boost pressure is corrected to be increased only when the oil-pan water amount (the amount of water in the oil pan 22) is at or above the determination water amount. Therefore, according to this embodiment, the freezing of the condensate water and the formation of the ice block at the connecting part X can be prevented when the oil-pan water amount is large and these are likely to occur, while the fuel efficiency is prevented from degrading due to the control of increasing the boost pressure when the oil-pan water amount is small.

Moreover, when the temperature of the engine oil collected in the oil pan 22 is low, the amount of water evaporated from the engine oil is small, thereby the amount of water contained in the blowby gas also being small. Accordingly, the formation of the ice block at the connecting part X is unlikely to occur. Regarding to this, in this embodiment, the target boost pressure is corrected to be increased only when the temperature of the engine oil collected in the oil pan 22 is at or above the determination temperature. Therefore, according to this embodiment, the formation of the ice block at the connecting part X, which is likely to occur when the temperature of the engine oil is high, can be prevented, while the fuel efficiency is prevented from degrading due to the control of increasing the boost pressure when the temperature of the engine oil is low.

Modifications

Although in the embodiment the boost pressure is increased and decreased by changing the opening of the wastegate valve 65, a concrete configuration to change the boost pressure is not limited to this configuration. For example, a turbocharger which can change an area of a passage through which exhaust gas passes inside the turbine (what is called a "Variable Geometry Turbo (VGT)") may be used, and the passage area may be changed to increase and decrease the boost pressure.

Moreover, although in the embodiment the intake temperature detected by the intake temperature sensor SN4 is used as the ambient temperature which is used for the calculation of the correction factor K (including the determination whether to correct the basic increasing amount), the ambient temperature used for this calculation (determination) is not limited to this configuration. For example, an ambient temperature sensor which detects the ambient temperature may be provided at a position different from the engine, and this detection value may be used.

Moreover, although in the embodiment the oil temperature (the temperature of the engine oil) is estimated based on the engine water temperature detected by the engine water temperature sensor SN2, an oil temperature sensor which can detect the oil temperature may be provided, and the detected oil temperature may be used for the calculations.

Moreover, the concrete structures of the engine to which the engine control device according to the embodiment, such as the number of cylinders, are not limited to the structures described above.

Moreover, the concrete values of the determination temperature Ta1, the determination water amount, the determination oil temperature, the given engine speeds N1 and N11, the basic increasing amount, and the correction factor K (the correction factor smaller than the determination temperature Ta1) are not limited to the values described above. For example, the value of the basic increasing amount may be set to be constant in the first range A1 regardless of the engine speed.

Moreover, the determination whether the oil temperature is at or above the determination oil temperature, and the determination whether the oil-pan water amount is at or above the determination water amount, may be omitted.

Moreover, although in the embodiment the blowby gas passage 71 is connected to the upstream intake passage 50A (the intake passage 50 upstream of the compressor 16), the blowby gas passage 71 may be connected to the downstream intake passage 50B (the intake passage 50 downstream of the compressor 16).

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body
14 Turbocharger
15 Turbine
16 Compressor
22 Oil Pan
50 Intake Passage
52 Throttle Valve
60 Exhaust Passage
63 Bypass Passage (Boost Pressure Changer)
65 Wastegate Valve (Boost Pressure Changer)
71 Blowby Gas Passage
100 ECU (Controller)
X Connecting Part

What is claimed is:

1. A control device for an engine provided with an engine body having a combustion chamber, an intake passage through which intake air to be introduced into the engine body passes, an exhaust passage through which exhaust gas discharged from the engine body passes, and a turbocharger configured to boost the intake air, the control device comprising:

a blowby gas passage connecting the engine body to the intake passage so that blowby gas leaked from the combustion chamber is recirculated to the intake passage;

a boost pressure changer configured to change a boost pressure of the turbocharger; and a controller configured to set a target boost pressure and control the boost pressure changer so that the boost pressure becomes the target boost pressure, the target boost pressure being a target value of the boost pressure, wherein the turbocharger includes a turbine provided to the exhaust passage and configured to be driven by the exhaust gas, and a compressor provided to the intake passage and configured to be rotary driven by the turbine to boost the intake air, wherein the blowby gas passage is connected to the intake passage near the compressor, and wherein the controller corrects the target boost pressure when an ambient temperature is below a given determination temperature, to be higher than the target boost pressure when the ambient temperature is at or above the determination temperature.

2. The control device of claim 1, further comprising a throttle valve provided to the intake passage and configured to open and close the intake passage, wherein, when the controller executes the correction of the target boost pressure, the controller controls the throttle valve so that an opening of the throttle valve becomes smaller than the opening when the ambient temperature is at or above the determination temperature.

3. The control device of claim 2, wherein the boost pressure changer includes a bypass passage provided to the exhaust passage and bypassing the turbine, and a wastegate valve configured to open and close the bypass passage to adjust an amount of exhaust gas passing through the bypass passage and the turbine, and wherein the controller controls an opening of the wastegate valve so that the boost pressure becomes the target boost pressure.

4. The control device of claim 3, wherein the controller executes the correction of the target boost pressure when an engine load is at or above a given load.

5. The control device of claim 4, further comprising an oil pan provided to a lower part of the engine body, wherein the controller executes the correction of the target boost pressure when an amount of water in the oil pan is at or above a given determination water amount.

6. The control device of claim 5, wherein the controller executes the correction of the target boost pressure when a temperature of engine oil collected in the oil pan is at or above a given determination temperature.

7. The control device of claim 1, wherein the boost pressure changer includes a bypass passage provided to the exhaust passage and bypassing the turbine, and a wastegate valve configured to open and close the bypass passage to adjust an amount of exhaust gas passing through the bypass passage and the turbine, and wherein the controller controls an opening of the wastegate valve so that the boost pressure becomes the target boost pressure.

8. The control device of claim 3, further comprising an oil pan provided to a lower part of the engine body, wherein the controller executes the correction of the target boost pressure when an amount of water in the oil pan is at or above a given determination water amount.

9. The control device of claim 3, wherein the controller executes the correction of the target boost pressure when a temperature of engine oil collected in an oil pan is at or above a given determination temperature, the oil pan being provided to a lower part of the engine body.

10. The control device of claim 4, wherein the controller executes the correction of the target boost pressure when a temperature of engine oil collected in an oil pan is at or above a given determination temperature, the oil pan being provided to a lower part of the engine body.

11. The control device of claim 7, wherein the controller executes the correction of the target boost pressure when an engine load is at or above a given load.

12. The control device of claim 7, further comprising an oil pan provided to a lower part of the engine body, wherein the controller executes the correction of the target boost pressure when an amount of water in the oil pan is at or above a given determination water amount.

13. The control device of claim 7, wherein the controller executes the correction of the target boost pressure when a temperature of engine oil collected in an oil pan is at or above a given determination temperature, the oil pan being provided to a lower part of the engine body.

14. The control device of claim 11, further comprising an oil pan provided to a lower part of the engine body, wherein the controller executes the correction of the target boost pressure when an amount of water in the oil pan is at or above a given determination water amount.

15. The control device of claim 11, wherein the controller executes the correction of the target boost pressure when a temperature of engine oil collected in an oil pan is at or above a given determination temperature, the oil pan being provided to a lower part of the engine body.

16. The control device of claim 12, wherein the controller executes the correction of the target boost pressure when a temperature of engine oil collected in the oil pan is at or above a given determination temperature.

17. The control device of claim 14, wherein the controller executes the correction of the target boost pressure when a temperature of engine oil collected in the oil pan is at or above a given determination temperature.

18. The control device of claim 1, wherein the controller sets the target boost pressure at a basic target boost pressure and inhibits a correction of the target boost pressure to be higher than the basic target boost pressure when any of the following four conditions is satisfied:

(1) the ambient temperature is at or above the determination temperature;

(2) the engine is operated in a range where an engine speed is at or above a given reference speed, and an engine load is below a given reference load;

(3) an amount of water in an oil pan is below a given determination water amount, the oil pan being provided to a lower part of the engine body; and (4) a temperature of engine oil collected in the oil pan is below a given determination oil temperature.

19. The control device of claim 18, wherein, when all of the four conditions are satisfied, the controller corrects the target boost pressure to be higher than the basic target boost pressure that is the target boost pressure when any of the four conditions is satisfied.

\* \* \* \* \*